(No Model.)
J. TRUSTY.
WHEEL.
No. 450,540. Patented Apr. 14, 1891.
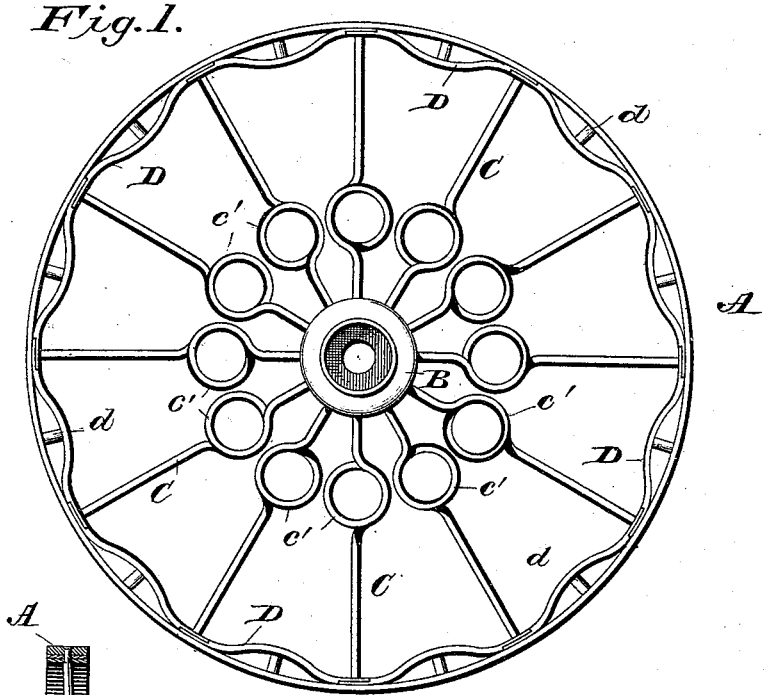
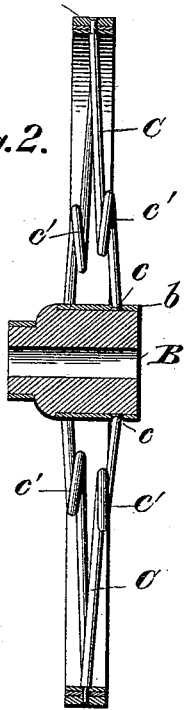
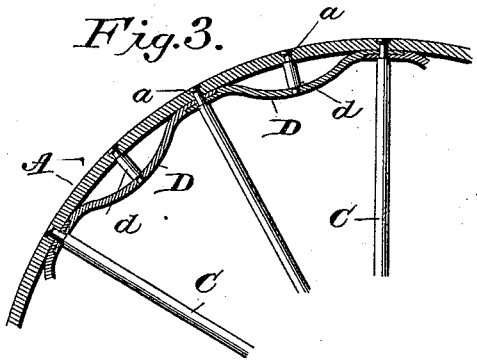
Witnesses
G. S. Elliott
E. W. Johnson
Joseph Trusty
Inventor
by [signature]
Attorney

United States Patent Office.

JOSEPH TRUSTY, OF FORT DODGE, IOWA.

WHEEL.

SPECIFICATION forming part of Letters Patent No. 450,540, dated April 14, 1891.

Application filed January 23, 1891. Serial No. 378,841. (No model.)

*To all whom it may concern:*

Be it known that I, JOSEPH TRUSTY, a citizen of the United States of America, residing at Fort Dodge, in the county of Webster and State of Iowa, have invented certain new and useful Improvements in Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in wheels.

The object of my invention is to provide a wheel with a rigid tire and a movable hub which is attached to said tire by spring-spokes; and it consists in the construction and combination of the parts, as will be hereinafter fully set forth, and particularly pointed out in the claims.

In the accompanying drawings, forming part of this specification, Figure 1 is a side view. Fig. 2 is a sectional view, and Fig. 3 a detail sectional view.

A refers to the rim or tire of the wheel, which is preferably made of metal, the ends being welded together in the usual manner. The tire is provided at suitable intervals with perforations $a\ a$, said perforations being countersunk on the outer edge of the tire.

B refers to a hub, which is provided with a metal band $b$, having a series of perforations $c\ c$ for the reception of the ends of the spokes. These perforations $c\ c$ may be countersunk on the inner side of the band $b$. The spokes C are dished, and their inner ends are alternately placed in the perforations in the opposite side of the band $b$. These spokes are coiled a single time upon themselves, so as to provide a spring portion $c'$, the members of the spokes being on a line with each other adjacent to these coiled portions, as shown in Fig. 1. The inner and outer ends of the spokes are attached by heading or any other suitable means to the tire A and to the band of the hub, and by this construction it will be readily seen that a spring movement may be given to the axle, and when a wheel of this construction is employed body-springs upon a vehicle may be dispensed with.

In order to re-enforce the rim or tire of the wheel, so as to prevent the same bending between the spokes C C, I provide the wheel with arched brace-plates D, which brace-plates have their ends perforated, so that the ends of the spokes may pass through said perforations, and centrally these brace-plates are provided with pins $d$, which pass through perforations $a'$ in the tire, the opposite ends being riveted to the plate D. By this construction I provide a wheel which has a spring-hub and a tire, which is braced so as to render the same rigid.

The ends of the spokes and pins $d$ are reduced in diameter, so as to provide shoulders, upon which the adjacent parts of the wheel will rest, so that said pins and spokes will be immovable when their ends are upset or welded.

Having thus described my invention, what I claim as new, and desire to secure by Letters Patent, is—

1. The combination, in a wheel having a trussed rim, of spokes leading therefrom to the hub, each of said spokes having a single coil disposed so as to be on a line with the rim, and arch brace-plates secured to the inner side of the rim between each spoke, substantially as set forth.

2. In a wheel, the spring-spokes C, rigidly attached to the tire and hub and provided near their centers with a single coil, and brace-plates D, rigidly attached to the tire and provided with central stay-pins, substantially as set forth.

3. The improved tire for wheels, provided between the spoke-sockets with curved brace-plates D, with perforated ends, through which the spokes pass, and a central stay-pin rigidly attached to the tire and center of the brace-plate, substantially as shown.

In testimony whereof I affix my signature in presence of two witnesses.

JOSEPH TRUSTY.

Witnesses:
W. J. CAMPBELL,
O. M. OLESON.